United States Patent
Dawson et al.

(10) Patent No.: US 10,926,456 B2
(45) Date of Patent: Feb. 23, 2021

(54) 3D PRINTING

(71) Applicant: International Business Machines Corporation, Armonk, NY (US)

(72) Inventors: Alan B. Dawson, Hursley (GB); Gordon D. Hutchison, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 16/004,059

(22) Filed: Jun. 8, 2018

(65) Prior Publication Data

US 2018/0290383 A1    Oct. 11, 2018

Related U.S. Application Data

(63) Continuation of application No. 14/565,806, filed on Dec. 10, 2014, now Pat. No. 10,081,132.

(30) Foreign Application Priority Data

Dec. 18, 2013    (GB) ...................................... 1322390

(51) Int. Cl.
*B29C 64/118* (2017.01)
*B29C 64/205* (2017.01)
(Continued)

(52) U.S. Cl.
CPC .......... *B29C 64/118* (2017.08); *B23K 26/354* (2015.10); *B29C 64/205* (2017.08);
(Continued)

(58) Field of Classification Search
CPC ... B29C 64/188; B29C 64/194; B29C 64/209; B29C 64/214; B29C 64/218
See application file for complete search history.

(56) References Cited

U.S. PATENT DOCUMENTS 4,260,873 A   4/1981  Simmonds
5,155,321 A * 10/1992  Grube ................... B22F 3/1055
                                                           264/497
(Continued)

FOREIGN PATENT DOCUMENTS

EP    2636511 A1    9/2013
EP    2705942 A1    3/2014

OTHER PUBLICATIONS

Khoshnevis et al., "Mega-scale fabrication by contour crafting," Int. J. Industrial and Systems Engineering, vol. 1, No. 3, pp. 301-320, 2006.

(Continued)

*Primary Examiner* — Robert C Dye
*Assistant Examiner* — Taryn Trace Willett
(74) *Attorney, Agent, or Firm* — ZIP Group PLLC

(57) ABSTRACT

A nozzle follower assembly is provided which is co-operable with a 3D printer. The nozzle follower assembly includes a surface portion modification apparatus. The follower assembly is co-operable with a 3D printer head nozzle assembly and is operable to cause the surface portion modification apparatus to modify at least a portion of a surface of a material most recently printed by the head nozzle assembly of the 3D printer. The surface portion modification apparatus may be used to smooth the surface of the material most recently printed by the head nozzle assembly of the 3D printer.

7 Claims, 5 Drawing Sheets

(51) Int. Cl.
 *B23K 26/354* (2014.01)
 *B29C 64/209* (2017.01)
 *B29C 64/214* (2017.01)
 *B29C 64/307* (2017.01)
 *B29C 64/343* (2017.01)

(52) U.S. Cl.
 CPC .......... *B29C 64/209* (2017.08); *B29C 64/214* (2017.08); *B29C 64/307* (2017.08); *B29C 64/343* (2017.08)

(56) References Cited

U.S. PATENT DOCUMENTS

| | | | | |
|---|---|---|---|---|
| 5,529,471 | A * | 6/1996 | Khoshevis | B29C 41/36 425/112 |
| 5,572,431 | A * | 11/1996 | Brown | B29B 13/023 700/95 |
| 5,837,960 | A * | 11/1998 | Lewis | B23K 26/34 219/121.63 |
| 6,280,784 | B1 * | 8/2001 | Yang | B33Y 70/00 426/231 |
| 6,504,127 | B1 * | 1/2003 | McGregor | B23K 26/0604 219/121.63 |
| 6,782,303 | B1 | 8/2004 | Fong | |
| 7,153,454 | B2 * | 12/2006 | Khoshnevis | B29C 64/106 264/34 |
| 7,189,344 | B2 * | 3/2007 | Rheinberger | A61C 13/0003 264/16 |
| 7,850,885 | B2 * | 12/2010 | Philippi | B29C 64/295 264/113 |
| 7,874,825 | B2 * | 1/2011 | Khoshnevis | B28B 3/2636 425/114 |
| 9,566,742 | B2 * | 2/2017 | Keating | B29C 64/227 |
| 2002/0129485 | A1 * | 9/2002 | Mok | G05B 19/4099 29/527.2 |
| 2005/0093208 | A1 * | 5/2005 | Boyd | B33Y 70/00 264/442 |
| 2005/0173838 | A1 * | 8/2005 | Priedeman, Jr. | B29C 64/124 264/401 |
| 2005/0173839 | A1 * | 8/2005 | Crump | B29C 33/3842 264/401 |
| 2009/0271323 | A1 * | 10/2009 | Zinniel | B22F 3/008 705/80 |
| 2009/0321972 | A1 * | 12/2009 | Zinniel | B33Y 40/00 264/37.13 |
| 2011/0282482 | A1 | 11/2011 | Knighton | |
| 2013/0108726 | A1 * | 5/2013 | Uckelmann | B33Y 10/00 425/174.4 |
| 2013/0197683 | A1 | 8/2013 | Zhang et al. | |
| 2013/0234369 | A1 * | 9/2013 | Schwarzler | B29C 64/40 264/401 |
| 2013/0295338 | A1 | 11/2013 | Keating et al. | |
| 2015/0048553 | A1 * | 2/2015 | Dietrich | B33Y 10/00 264/401 |
| 2015/0093283 | A1 | 4/2015 | Miller et al. | |
| 2015/0125657 | A1 * | 5/2015 | Knestel | C04B 35/622 428/141 |
| 2015/0145171 | A1 * | 5/2015 | Walker | B33Y 10/00 264/401 |
| 2015/0217517 | A1 * | 8/2015 | Karpas | B29C 64/106 264/464 |
| 2016/0271874 | A1 * | 9/2016 | Tsai | B29C 64/209 |
| 2017/0015060 | A1 * | 1/2017 | Lewicki | B29C 64/118 |
| 2017/0050268 | A1 | 2/2017 | Fujiya et al. | |
| 2017/0157845 | A1 | 6/2017 | Bihari et al. | |
| 2018/0001558 | A1 | 1/2018 | Taff et al. | |
| 2019/0009472 | A1 * | 1/2019 | Mark | B33Y 30/00 |

OTHER PUBLICATIONS

List of IBM Patents or Patent Applications Treated as Related, dated herewith.

* cited by examiner

*Figure 1*  *Prior Art*
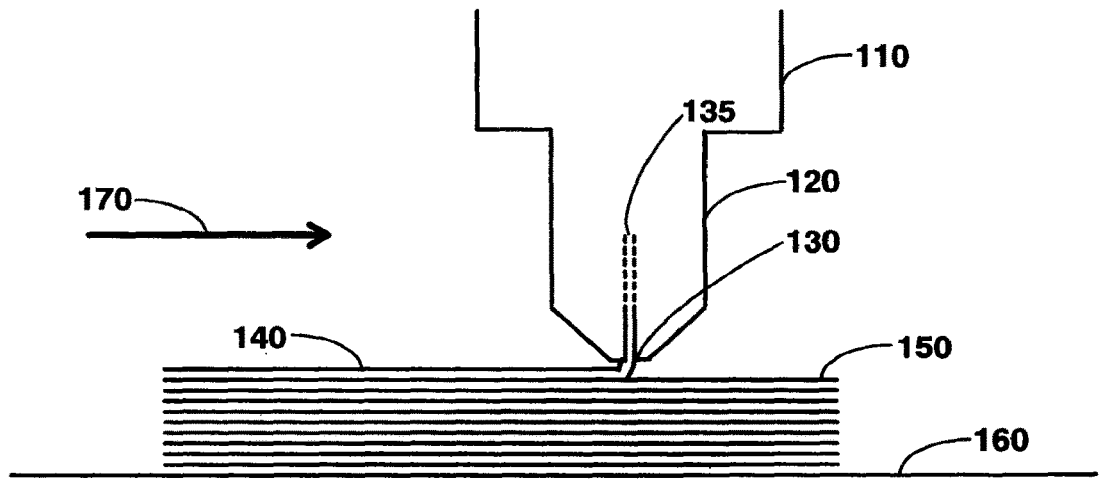
*Figure 2*  *Prior Art*
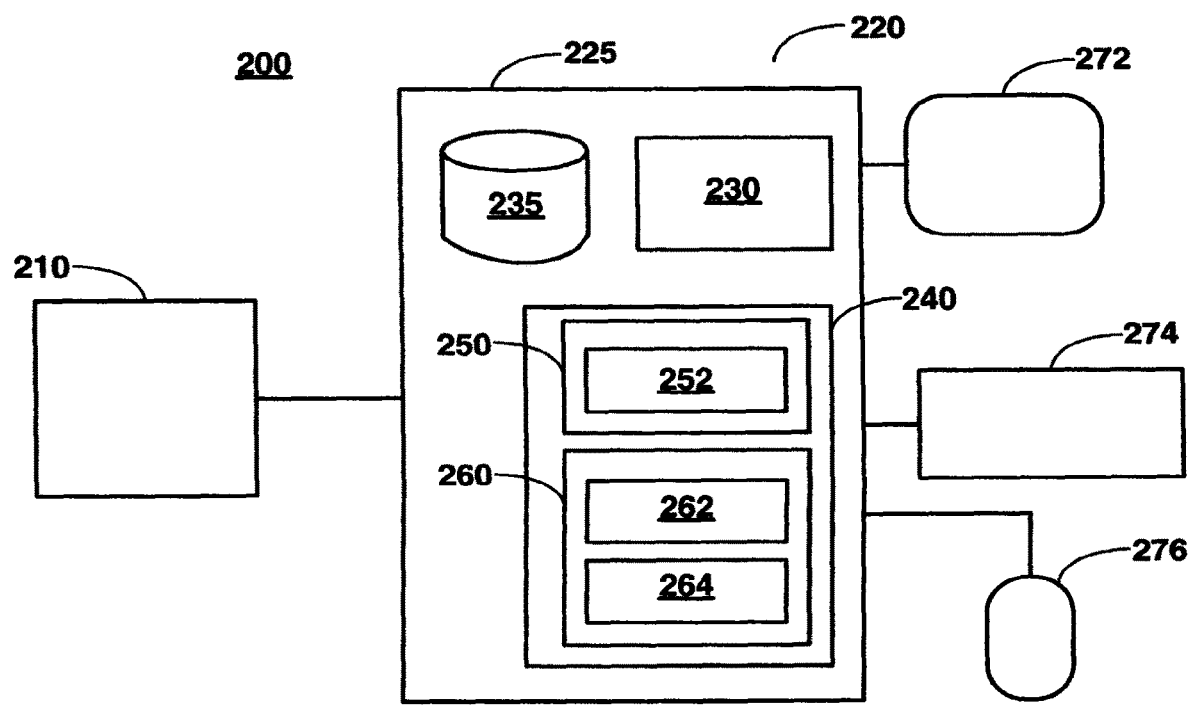

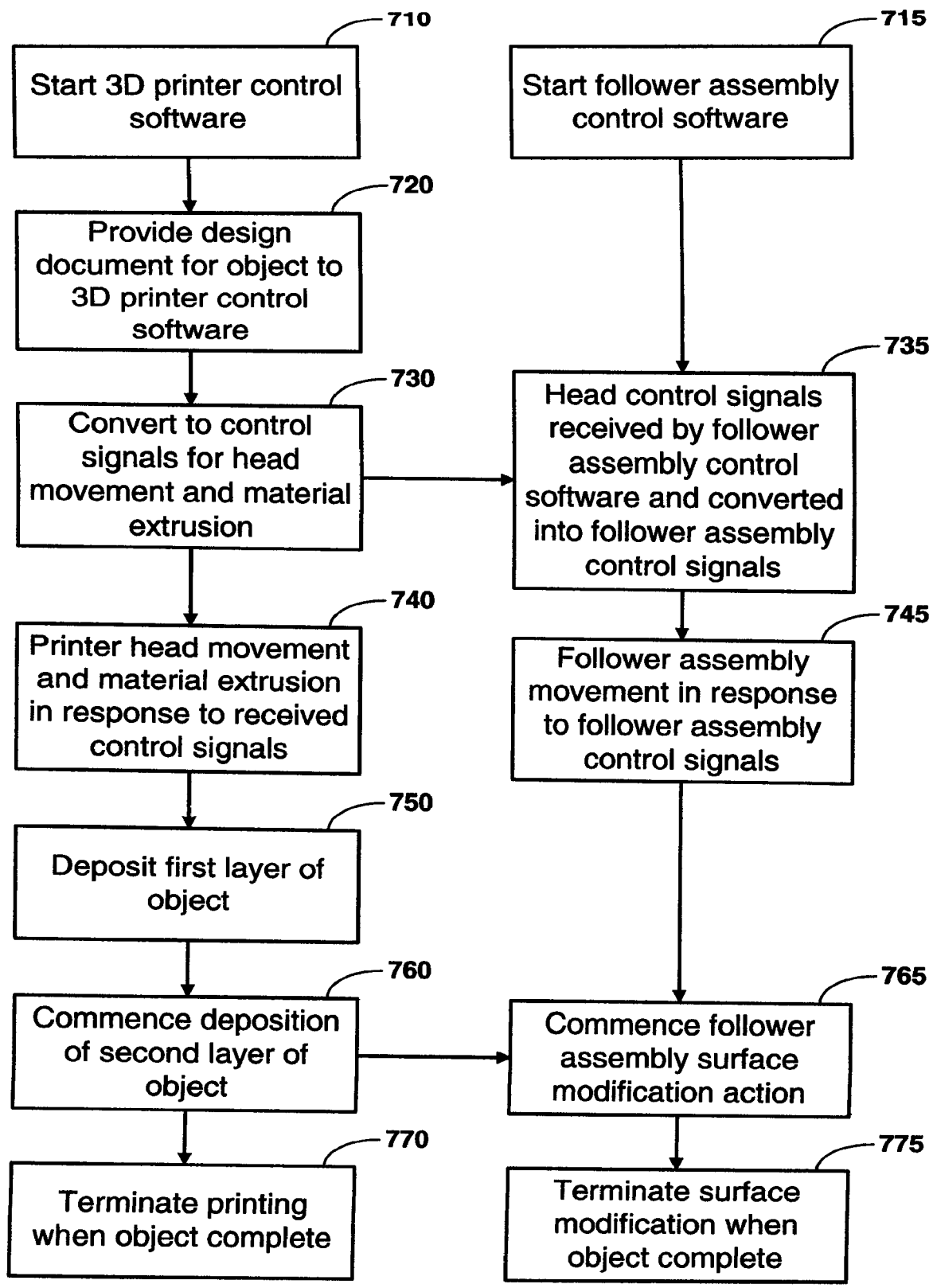

3D PRINTING

FIELD OF THE INVENTION

The invention relates to a 3D printing apparatus. More particularly, the invention relates to improvements to a 3D printing apparatus producing a modified surface of articles produced by the apparatus.

BACKGROUND 3D printing is the term used for a process of making a three-dimensional solid object by the laying down of successive layers of an extrudable and settable material from a moving dispenser. The first examples of apparatus performing a process meeting this description were produced in the nineteen eighties.

An example of such an apparatus is described in European patent number EP0833237. This describes an apparatus which incorporates a movable dispensing head provided with a supply of material which solidifies at a predetermined temperature, and a base member, which are moved relative to each other along "X", "Y," and "Z" axes in a predetermined pattern to create three-dimensional objects by building up material discharged from the dispensing head onto the base member at a controlled rate. The apparatus is preferably computer driven. Three-dimensional objects may be produced by depositing repeated layers of solidifying material until the shape is formed.

In recent years the costs of 3D printers have fallen substantially so that the range of applications for which they are useful has greatly increased. The technology is now much more accessible, with more commercially available devices. Many hobbyists have also built their own 3D printers of various designs.

A typical 3D printer comprises a moving head into which a plastic filament, typically about 3 mm in diameter, is fed. This passes over a heating mechanism and is forced through a nozzle which is formed, for example, of a metal or metal alloy such as brass. The nozzle comprises a circular aperture, for example of 0.35 mm diameter which deposits a thread of up to 1 mm diameter. Such apparatus is usually computer controlled. Computer software executing on the computer typically translates a digital design into the required head movements to build up a three-dimensional object by successive thread deposition.

The material used in 3D printers as described above typically comprises one or more plastics materials, typically thermoplastics, and particularly acrylonitrile butadiene styrene (ABS). Other thermoplastics which have been used successfully include nylon, polystyrene and polylactic acid (PLA).

A problem with the method of deposition described above is that the surfaces of articles produced show imperfections as a result of the method of deposition. For example, where a plastics material such as ABS is used, a ridged pattern on the surface results from the successive deposition of individual filaments onto a previously set filament layer. It would be advantageous to provide a method for mitigating these effects.

BRIEF SUMMARY OF THE INVENTION

Accordingly, the present invention provides, viewed from a first aspect, a surface portion modification apparatus co-operable with a 3D printer and comprising: a head nozzle follower assembly, the follower assembly co-operable with a 3D printer head nozzle assembly and operable for modifying at least a portion of a surface of the material of a 3D object printed by the head nozzle assembly. Advantageously, this provides an apparatus for modifying the surface of an object printed by a 3D printer so as to alter its appearance, for example by smoothing the surface.

Preferably in the surface portion modification apparatus, the follower assembly is co-operable with the head nozzle assembly by following its path. Advantageously, this allows surface portions of the object recently printed by the 3D printer to be modified.

Preferably, in the surface portion modification apparatus, the follower assembly is mounted adjacent to the head nozzle assembly. Advantageously, this allows the follower assembly to modify the surface of recently printed portions of the object.

Preferably, in the surface portion modification apparatus, the follower assembly is operable for moving in the horizontal plane around the head nozzle so as to follow the path of the head nozzle. Advantageously, this allows the follower assembly to be moved so as to be positioned above the portion of the object recently printed by the 3D printer.

Preferably, in the surface portion modification apparatus, the follower assembly is operable for moving in the vertical direction relative to the 3D object printed by the head nozzle. Advantageously, this allows the follower assembly to be positioned at a suitable distance above the object being printed.

Preferably, in the surface portion modification apparatus, modifying at least a portion of a surface of the material of the 3D object comprises inducing flow in at least a portion of the surface. Advantageously, this produces a surface modifying effect, for example a smoothing effect.

Preferably, in the surface portion modification apparatus, the material printed by the 3D printer head nozzle assembly is a plastics material. Advantageously, this provides the printing of plastics objects which may have their surface modified.

Preferably, in the surface portion modification apparatus, the follower assembly comprises a mechanism for delivering a plastics flow inducing agent to the material surface. Advantageously, this supplies the agent to induce plastics flow to the portion of the object surface to be modified.

Preferably, in the surface portion modification apparatus, the plastics flow inducing agent comprises a plastics solvent vapor. Advantageously, this can produce an effective surface modifying effect at relatively low temperatures.

Preferably, in the surface portion modification apparatus, the plastics solvent vapor comprises acetone vapor. Advantageously, acetone is an effective surface modification agent for plastics, particularly thermoplastics such as ABS.

Preferably, in the surface portion modification apparatus, additional apparatus are provided for solvent vapor recovery after it has been delivered to the surface. Advantageously, this limits escape of solvent vapor, and allows solvent reuse.

Preferably, in the surface portion modification apparatus, the plastics flow inducing agent comprises a heated gas. Advantageously, this provides an alternative to the use of solvents which may require special handling arrangements.

Preferably, in the surface portion modification apparatus, the heated gas is heated air. Advantageously, this does not require the provision of a separate gas supply.

Preferably, in the surface portion modification apparatus, the follower assembly comprises an electromagnetic radiation generator for inducing flow in at least a portion of the object surface by the heating effect of radiation generated thereby. Advantageously, this allows an alternative to the use of a gas or vapor which require arrangements for handling and delivery.

Preferably, in the surface portion modification apparatus, the electromagnetic radiation generator comprises a laser. Advantageously, this allows the delivery of a heating effect precisely to a desired portion of the object surface.

Viewed from a second aspect, the invention provides a method comprising: providing a head nozzle follower assembly; and modifying by the head nozzle follower assembly at least a portion of a surface of a 3D object printed by a 3D printer head nozzle assembly of a 3D printer by the head nozzle follower assembly operating co-operatively with the head nozzle assembly.

Preferably, in the surface portion modification method, the head nozzle follower assembly operating co-operatively with the head nozzle assembly comprises following its path.

Preferably, in the surface portion modification method, the follower assembly is mounted adjacent to the head nozzle assembly.

Preferably, in the surface portion modification method, the follower assembly moves in the horizontal plane around the head nozzle so as to follow the path of the head nozzle.

Preferably, in the surface portion modification method, the follower assembly moves in the vertical direction relative to the 3D object printed by the head nozzle.

Preferably, in the surface portion modification method, the head follower modifies at least a portion of a surface of the material of the 3D object by inducing flow in at least a portion of the surface.

Preferably, in the surface portion modification method, the 3D printer head nozzle assembly prints a plastics material.

Preferably, in the surface portion modification method, the follower assembly delivers a plastics flow inducing agent to the material surface.

Preferably, in the surface portion modification method, the plastics flow inducing agent comprises a plastics solvent vapor.

Preferably, in the surface portion modification method, the plastics solvent vapor comprises acetone vapor.

Preferably, in the surface portion modification method, solvent vapor is recovered after it has been delivered to the surface.

Preferably, in the surface portion modification method, the plastics flow inducing agent comprises a heated gas.

Preferably, in the surface portion modification method, the heated gas comprises heated air.

Preferably, in the surface portion modification method, flow of at least a portion of the object surface is induced by the heating effect of radiation produced by an electromagnetic radiation generator of the follower assembly.

Preferably, in the surface portion modification method, the electromagnetic radiation generator is a laser.

Viewed from a third aspect, there is provided a surface portion modification system comprising: a 3D printer comprising a 3D printer head nozzle assembly; a head nozzle follower assembly co-operable with the 3D printer head nozzle assembly and operable for modifying at least a portion of a surface of a 3D object printed by the head nozzle assembly as in the first aspect of the invention; and computing apparatus operable for controlling operation of the 3D printer and the head nozzle follower assembly.

Viewed from a fourth aspect, there is provided a method of manufacturing a surface portion modification apparatus comprising: providing a 3D printer comprising a 3D printer head nozzle assembly; providing a head nozzle follower assembly, mounted so as to be operable for modifying at least a portion of a surface of a 3D object printed by the head nozzle assembly of the first aspect.

Viewed from a fifth aspect, there is provided a computer program comprising computer program code stored on a computer readable medium to, when loaded into a computer system linked to suitable computer-controlled apparatus and executed thereon, cause said computer system and said apparatus to perform all the steps of a method according to the second aspect.

BRIEF DESCRIPTION OF THE DRAWINGS

Preferred embodiments of the present invention will now be described, by way of example only, with reference to the following drawings in which:

FIG. 1 illustrates a 3D printer in accordance with the prior art;

FIG. 2 is a diagrammatic representation of a 3D printing system in accordance with the prior art;

FIG. 7 is a flow chart illustrating the operation of a 3D printing system including a follower assembly in accordance with an embodiment of the invention.

DETAILED DESCRIPTION OF THE EMBODIMENTS

Figure 3:
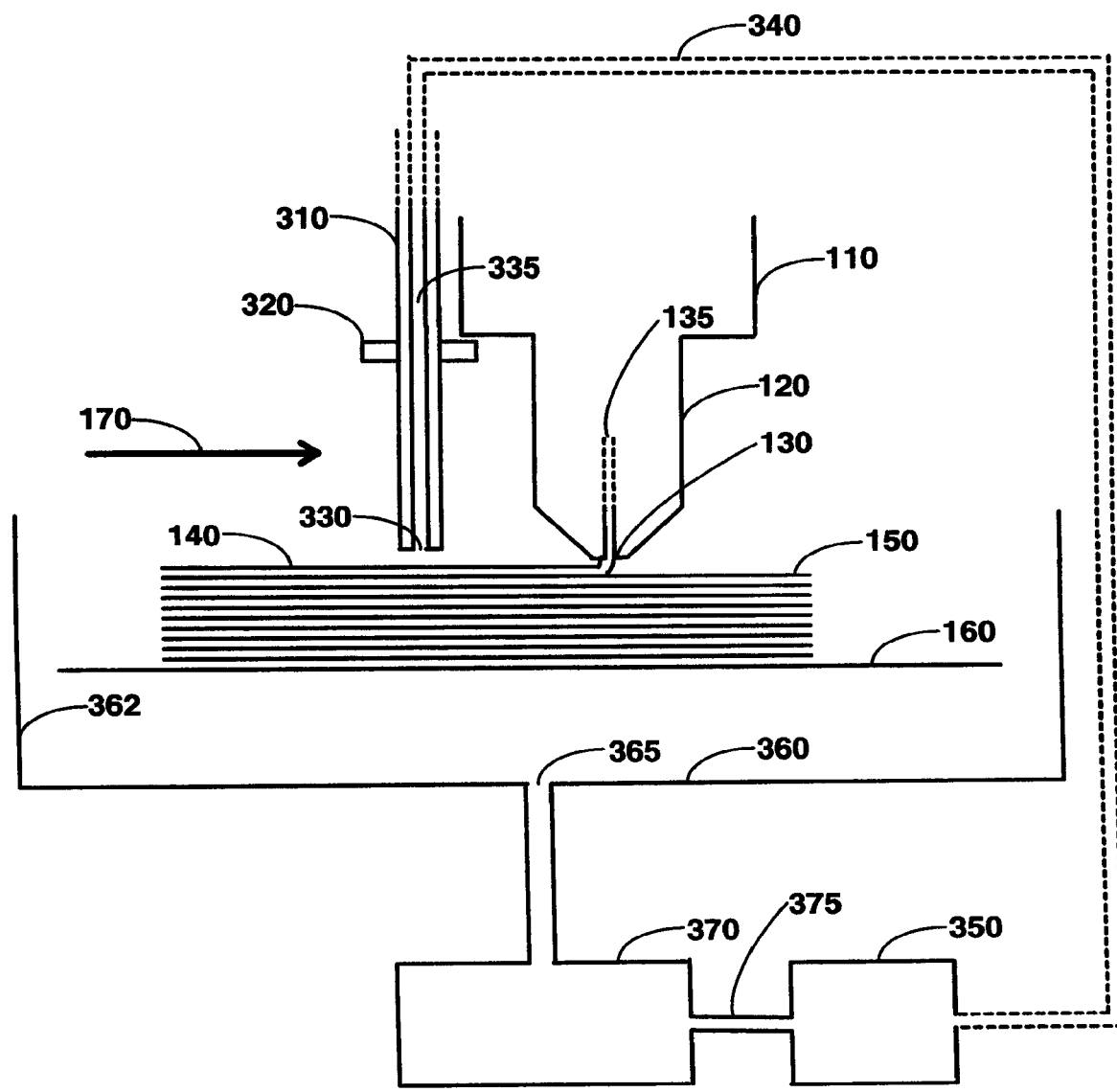
FIG. 3 illustrates a 3D printer including a follower assembly in accordance with an embodiment of the invention.

FIG. 1 illustrates the operation of a 3D printer of the prior art. It is a simplified diagrammatic cross section of a 3D printer, more particularly the printer head, to show the method of operation, and is not intended to show all the elements of such a 3D printer and nor is it necessarily drawn to scale. An exemplary 3D printer according to the prior art comprises printer head assembly 110 and object support base 160 on to which the printer head prints the object to be printed. Head assembly 110 and base 160 are moveable relative to each other in the X, Y and Z directions, where X and Y are the axes of movement in the horizontal plane and Z the axis in the vertical direction upwards relative to base 160. In some embodiments, the base 160 remains stationary, and the head assembly 110 is moved by suitably mounted and controlled electric motors (not shown) either directly or via a movement transfer mechanism, for example via drive belts, so as to build up an object of a required shape and size. As will be understood by the skilled person, other embodiments are possible in which the head assembly 110 remains stationary, and the base 160 is moved. It will also be appreciated that other embodiments may be envisaged in which both head assembly 110 and base 160 are moved to varying degrees to build up a printed object.

Head assembly 110 comprises printing nozzle 120 which comprises nozzle orifice 130. Nozzle orifice 130 is typically of circular cross-section, and is at the end of material feed tube 135 through which material to be printed is delivered to nozzle orifice 130. When head assembly 110 is printing, material to be printed is fed in to the printer head assembly 110 remote from nozzle orifice 130. In one embodiment, material to be printed comprises a thermoplastic such as acrylonitrile butadiene styrene (ABS) which is fed in to head assembly 110 as a filament of typically 3 mm diameter, but any suitable material and delivery form and size may be used.

Within head assembly 110 is a heating mechanism, for example comprising an electrical resistance heating element (not shown), over which the ABS filament is passed. When the plastic filament is passed over the heating element in head assembly 110, it is heated to a temperature above its glass transition temperature and the resulting flowable viscous plastic is forced by a pressure source of head assembly 110 (not shown) down feed tube 135 of nozzle 120. It is then extruded from nozzle orifice 130. In one embodiment nozzle orifice 130 is of circular cross section of diameter 0.35 mm, but any suitable shape and dimensions may be used.

As the plastic thread is extruded from nozzle orifice 130, head assembly 110 is moved relative to base 160 in, for example, direction 170 so as to lay down an extruded filament 140 which hardens on cooling to produce a required shape. Typically, a nozzle orifice 130 of diameter 0.35 mm produces an extruded filament 140 of diameter approximately 1 mm.

Head assembly 110 is moved in a predetermined pattern relative to base 160, horizontally in X and Y directions, and vertically in the Z direction, so as to form an object 150 by successive layered filaments deposited by head assembly 110.

FIG. 2 illustrates a system 200 comprising a 3D printer 210 and a computing apparatus 220 for controlling 3D printer 210 according to the prior art. Computing apparatus 220 is illustrated as a programmable general purpose computer, but a person skilled in the art will understand that computing apparatus 220 may be in some alternative embodiments a specialist control apparatus, and in further alternative embodiments may be integrated with 3D printer 210. Computing apparatus 220 comprises system unit 225, and may further comprise user input and output apparatus, for example keyboard 274, mouse 276 and display 272. System unit 225 comprises central processor unit 230, non-volatile storage, for example hard disk drive 235, and volatile storage 240.

During operation of computing apparatus 220, system software 250 including operating system software 252 is loaded in to volatile storage 240. Under control of operating system 252 application software 260 is loaded in to volatile storage 240. Application software 260 includes 3D printer control software 262. 3D printer control software 262 utilizes an object design document which comprises software describing a sequence of operational signals to control the movement of 3D printer head assembly 110 in the predetermined pattern described above. 3D printer control software 262 also controls production of extruded material 140 from nozzle orifice 130 so as to build up the required three-dimensional object. The object design document may be provided to a user by an external creator as a software file, or set of files, on portable non-volatile storage and loaded to computing apparatus 220, or alternatively it may be downloaded from an external network such as the Internet. In some embodiments, the object design document may be created by the user on computing apparatus 220 using optional computer-aided design software 264 loaded into volatile storage 260.

An embodiment of the present invention is illustrated in FIG. 3. In this embodiment, there is provided a mechanism for modifying the surface of recently deposited material. More particularly, there is provided in this embodiment a mechanism for inducing surface flow of recently deposited material 140 extruded from head nozzle orifice 130 of printing nozzle 120 of 3D printer head assembly 110. The mechanism comprises a follower assembly 310 which is co-operable with 3D printer head assembly 110. In this embodiment, follower assembly 310 is mounted adjacent to printer head assembly 110. In this embodiment, follower assembly 310 is operable for moving around printer head assembly 110 in substantially a horizontal plane with respect to printer head assembly 110. Follower assembly 310 is supported by mounting means 320 which performs the functions of retaining follower assembly 310 adjacent to printer head assembly 110, whilst allowing follower assembly 310 to be moved in the horizontal plane around substantially the whole of the circumference of printer head assembly 110.

In one embodiment, movement of follower assembly 310 describes a substantially circular path in the horizontal plane (X and Y directions) around the circumference of printer head assembly 110. In use of printer head assembly 110, follower assembly 310 is moved so as to follow the line of movement of printer head assembly 110, for example in direction indicated by arrow 170, so as to remain approximately above recently extruded filament 140 produced by printer nozzle orifice 130 of printer head nozzle 120.

In one embodiment, mounting means 320 comprise a retaining rail (not shown) or similar mechanism attached around printer head assembly 110. Movement of follower assembly 310 around printer head assembly 110 may be induced by any suitable motor driven movement mechanism, for example an electric motor (not shown) mounted on printer head assembly 110 and driving a mechanical linkage mechanism linked to follower assembly 310. It will be apparent to the person skilled in the art that other arrangements are possible for mounting the follower assembly 310 without departing from the scope of the present invention.

In one alternative embodiment, follower assembly 310 is not mounted on a mechanism around printer head assembly 110 but has a completely separate mounting and moving mechanism whose movement is coordinated with that of printer head assembly 110, for example under the control of a suitable computing apparatus. In another alternative embodiment, separately mounted follower assembly 310 is operated by control of the suitable computing apparatus after the printer head assembly 110 has finished printing the object. In all embodiments, the mechanism used is also operable for positioning follower assembly at a distance above recently extruded filament 140 suitable for producing the required effect, as described below.

In the present embodiment, follower assembly 310 is operable for producing a surface modifying agent comprising a stream of vapor from orifice 330 at the end of a supply channel 335 within follower assembly 310. In one embodiment, the vapor is produced from a volatile liquid which is a plastics solvent. In one embodiment, the vapor is acetone vapor. Acetone vapor may be produced by heating acetone liquid above its boiling point, which is at normal atmospheric pressure approximately 56 degrees Celsius. In one embodiment, acetone liquid is provided in a substantially closed container within an acetone vapor generator 350 linked by supply pipe 340 to supply channel 335 and thence to orifice 330. The acetone is heated by any suitable heating means, for example an electrical resistance heater (not shown), within acetone vapor generator 350. In this embodiment, extruded filament 140 is of a thermoplastic material such as ABS.

The flow of acetone vapor from orifice 330 is in close proximity to extruded filament 140. Acetone is a solvent for ABS and for many other thermoplastic materials. The effect of the vapor as it condenses on the extruded ABS filament 140 and adjacent previously deposited object 150 is therefore to partially dissolve the surface layer so as to produce a softened plastic and induce a degree of localized flow of the material. The appearance of the surface is thereby modified so as to produce, for example, a smoothed effect. The effect of this is to substantially eliminate the appearance of ridging between extruded filament 140 and the deposited filament of object 150 immediately adjacent to it. The acetone vapor is volatile and evaporates from the thus modified surface causing the ABS at the surface of extruded filament 140 and adjacent portion of object 150 to then solidify, and thereby to subsequently retain the modified surface.

Further additions to the above embodiment may be envisaged by persons skilled in the art. In one embodiment, a mechanism for collection of acetone vapor is provided. Such a mechanism may comprise, for example, the structure as diagrammatically illustrated in FIG. 3. This comprises a partially enclosing structure within which base 160 of the 3D printer is mounted. As illustrated in FIG. 3, the partially enclosing structure comprises an open topped tank structure 360 comprising retaining wall 362 raised to a level somewhat above base 160. Also provided is an exit means for the acetone vapor from the partially enclosing tank, as provided for example by exit orifice 365. Attached to exit orifice 365 is acetone collector 370 which includes a suction means for extracting acetone vapor retained in tank structure 360. Acetone collector 370 optionally condenses acetone vapor to liquid acetone before passing it via connector pipe 375 to acetone vapor generator 350 for reuse.

A person skilled in the art will understand that any other suitable volatile plastics solvent may be used without departing from the scope of the invention.

Figure 4:
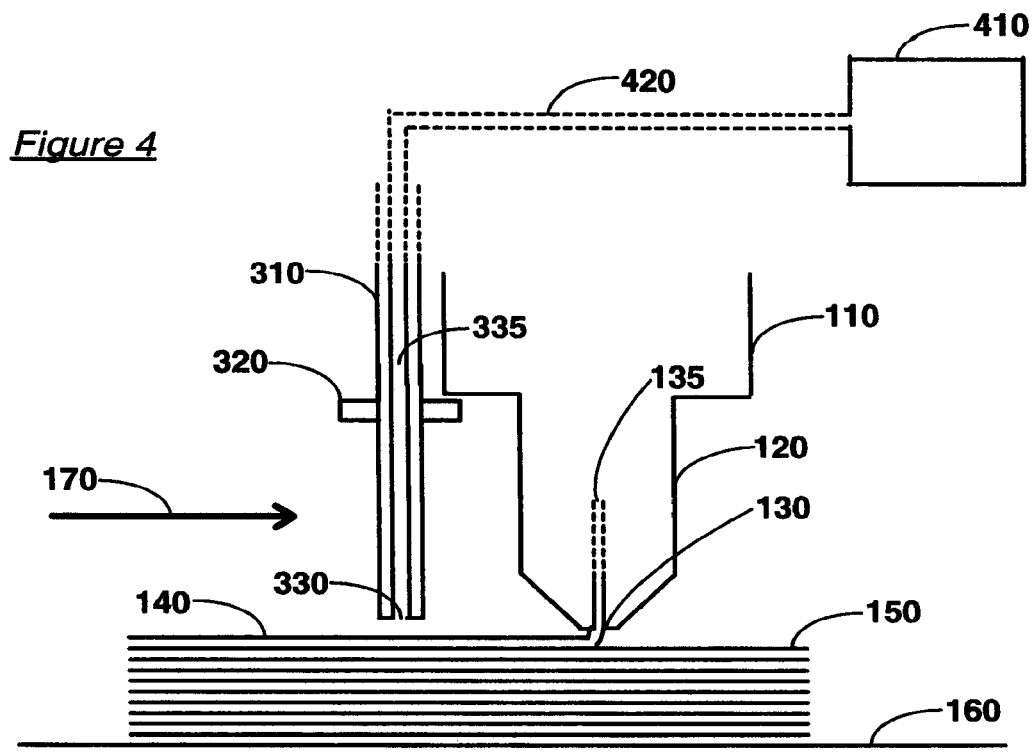
FIG. 4 illustrates a 3D printer including a follower assembly in accordance with an alternative embodiment of the invention.

FIG. 4 illustrates another embodiment of the present invention. In this embodiment, a surface modifying agent comprising a heated gas or gas mixture is emitted by follower assembly 310, for example heated ambient air. Gas heating assembly 410 comprises a heating mechanism, for example comprising an electrical resistance heater (not shown) for raising air to a temperature sufficient to soften a thermoplastic extruded by printer head assembly 110 from orifice 130. Ambient air is ingested via an inlet (not shown) into gas heating assembly 410 where it is heated by the heating mechanism to a temperature above that required for sufficient softening of the thermoplastic being used in the 3D printer.

The heated air is then delivered, for example using a suitable pumping mechanism, by gas heating assembly 410 via connecting pipe 420 to supply channel 335 of follower assembly 310 and thence to orifice 330 where it exits. Heat transferred from the heated air to the surface of the deposited thermoplastic object 140, 150 raises the temperature of the surface sufficiently for softening and so surface layer flow to result, producing a modified surface, particularly a smoothing effect as in the previously described embodiment. This smoothed surface is retained when the thermoplastic cools and solidifies after the follower assembly has moved away.

Figure 5:
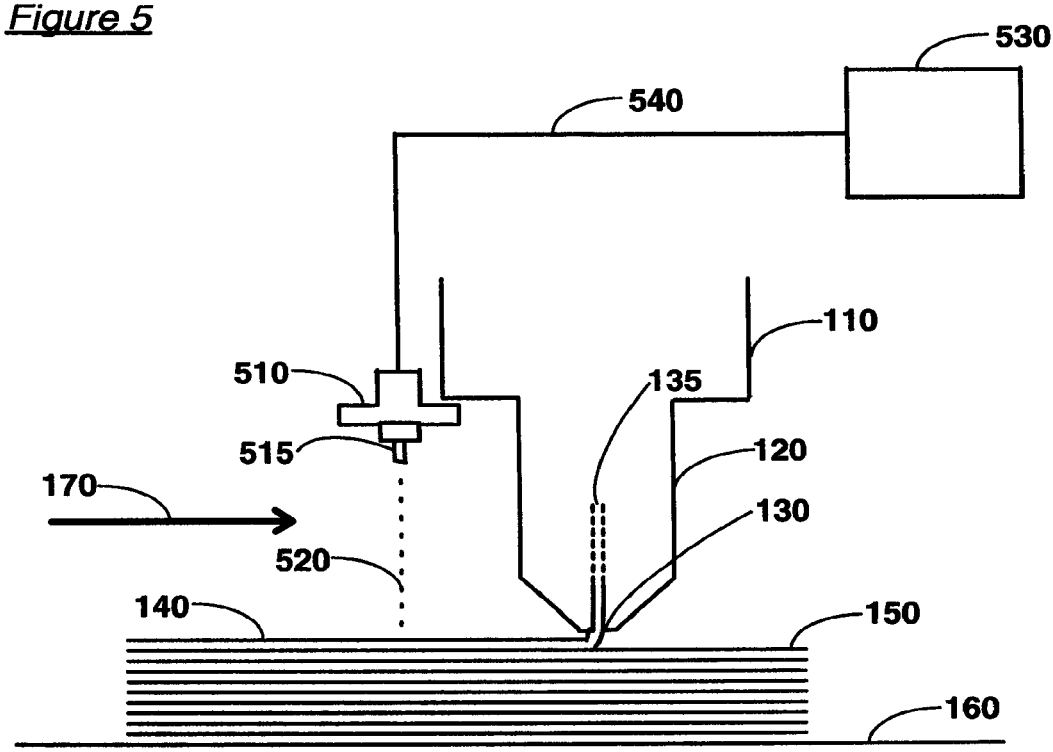
FIG. 5 illustrates a 3D printer including a follower assembly in accordance with a further alternative embodiment of the invention.

In another embodiment, electromagnetic radiation is used as surface modifying agent in place of heated gas of the previous embodiment to produce a heating of the surface of the deposited thermoplastic object 140, 150. FIG. 5 illustrates an embodiment in which the source of electromagnetic radiation is a laser. Follower assembly 510 comprises movement and control arrangements substantially identical to those suitable for previously described embodiments. Follower assembly 510 further comprises laser assembly 515 generating a focused laser light beam 520. Laser assembly 515 is electrically connected by connection 540 to suitable laser power supply 530.

Laser assembly 515 is adapted to produce a beam of laser light radiation 520 of such wavelength and power as to be operable for absorption by the surface of the deposited thermoplastic object 140, 150, and to thereby cause a local heating effect sufficient to induce melting and surface layer flow as in the previous embodiment using heated gas. A person skilled in the art will understand that the wavelength of the electromagnetic radiation produced by the laser is not limited to the visible part of the spectrum but may also include a wavelength in the infra red or ultra violet, for example. As in the previous embodiment, a surface layer flow is produced by the heating effect so as to result in a modified surface, in particular a smoothed surface, which is retained when the surface cools and solidifies after the follower assembly has moved away.

Figure 6:
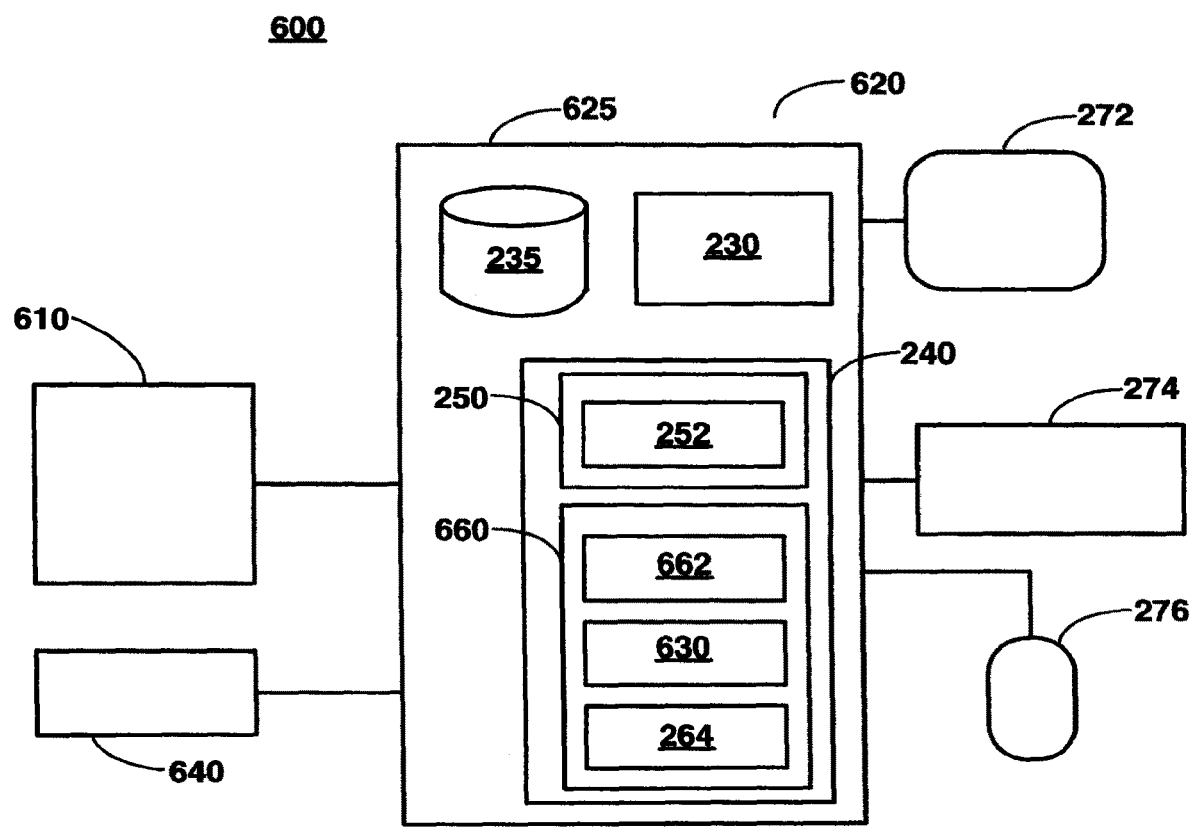
FIG. 6 is a diagrammatic representation of a 3D printing system including a follower assembly in accordance with an embodiment of the invention.

FIG. 6 illustrates a system 600 according to a preferred embodiment of the present invention. System 600 comprises 3D printer 610 of similar type to that described with reference to the prior art of FIGS. 1 and 2 and as used in the previously described embodiments as illustrated in FIGS. 3, 4 and 5. System 600 further comprises follower assembly 640, which may be for example the follower assembly of any of the previously described embodiments. Computing apparatus 620 comprises system unit 625 which may comprise internal componentry identical to those of system unit 220 of the prior art, and further may comprise peripherals identical to those of the prior art.

System unit 625 comprises volatile storage 240, into which is loaded system software 250 including operating system software 252 as in the prior art. Also loaded into volatile storage 240 is application software 660 which comprises 3D printer control software 662 which controls the operation of the 3D printer as described with reference to the control software 262 of the prior art. 3D printer control software 662 therefore utilizes an object design document which comprises software describing a sequence of operational signals to control the movement of 3D printer head assembly 110 in the predetermined pattern described above with reference to the prior art. 3D printer control software 662 also controls production of extruded material 140 from nozzle orifice 130 so as to build up the required three-dimensional object as described above with reference to the prior art.

Application software 660 also comprises follower assembly control software 630. Follower assembly control software 630 is operable to control movement and operation of follower assembly 640. Follower assembly control software 630 is operable to read 3D printer control signals from 3D printer control software 662 which control movement and operation of printer head assembly 110 and to convert these in to follower assembly control signals. The follower assembly control signals control the operation of the follower assembly operation mechanism which may comprise suitable motors and linkage mechanisms as in previously described embodiments. The skilled person will understand that 3D printer control software 662 and follower assembly control software 630 may be provided in a single software application, for example a modified 3D printer control software application 662, without departing from the scope of the invention.

The operation of follower assembly 640 is controlled so that it follows the movement of 3D printer head assembly 110 so as to be behind it and to substantially follow its track. Follower assembly control signals may be further operable for controlling the operation state of the follower assembly, for example in the embodiment illustrated in FIG. 3 turning on or off acetone vapor production, in the embodiment illustrated in FIG. 4 turning on or off the production of heated gas, and in the embodiment illustrated in FIG. 5 turning the laser on or off.

FIG. 7 is a flow diagram illustrating the operation of an embodiment of the present invention. At step 710, 3D printer control software is started and loaded in to application software 660 in volatile storage 240 of system unit 625 of computing apparatus 620 of the previously described embodiment. At step 720, a design document or similar descriptor of the object to be printed is provided to 3D printer control software 662. At step 715, which occurs at the same time or at any suitable time up to the point at which it is required, follower assembly control software 630 is loaded in to application software 660 in volatile storage 240. At step 730, 3D printer control software converts the information contained in the design document to control signals operable for control of the head movement and material extrusion of the 3D printer.

At step 740, movement of 3D printer head assembly 110 of 3D printer 610 and extrusion of printing material are carried out by printer head control mechanism in response to instructions of received control signals. At step 735, the control signals are also received by follower assembly control software 630 which converts them in to follower assembly control signals which are passed to follower assembly 640. Follower assembly 640 may then commence movement to follow the path of head assembly 110, at the same time or at any time up to the point at which surface modification action commences. As mentioned previously with reference to FIG. 6, 3D printer control software 662 and follower assembly control software 630 may form a single application, such as a modified 3D printer control application 662, so that steps 730 and 735 take place within the running instance of this single application, without departing from the scope of the present invention.

At step 750, the filament making up the first layer of the object to be printed is deposited by printer head assembly 110. At commencement of deposition of the second layer of the object at step 760, or at any suitable time, surface modification action is initiated by follower assembly 640 at step 765. Depending upon the particular embodiment this may be, for example, commencement of acetone generation (embodiment described with reference FIG. 3), commencement of hot air delivery (embodiment described with reference to FIG. 4), or turning on of electromagnetic radiation source (embodiment described with reference to FIG. 5), or the commencement of any other surface modification action. At step 770 operation of 3D printer 610 is stopped as printing is terminated with completion of printing of the object being printed. At approximately the same time, surface modification action by follower assembly 640 is also terminated at step 775.

It will be understood by a person skilled in the art that other embodiments of the present invention may be envisaged without departing from the scope of the present invention. For example, although embodiments have been described with reference to a moving follower assembly, it will be understood that follower movement may be within a fixed assembly. Such a fixed assembly may for example include a construction in which supply of a modification agent may be diverted to different points surrounding the 3D printer head assembly, so that delivery of the agent follows the direction of the deposition of extruded thread 140 without there being any moving mechanical means at the point of agent delivery.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), compact disc read/write (CD-R/W) or DVD disc, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages (Java and all Java-based trademarks and logos are trademarks or registered trademarks of Oracle and/or its affiliates; other marks may be trademarks or registered trademarks of their respective owners). The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method. Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as an FPGA.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear to one skilled in the art that many improvements and modifications can be made to the foregoing exemplary embodiment without departing from the scope of the present invention.

The invention claimed is:

1. A three-dimensional material printing method comprising:
    printing a material from a head nozzle that is movable relative to a base that is operable to receive the material printed from the head nozzle;
    rotating, with a follower assembly, a surface modification apparatus around a circumference of the head nozzle to follow a path of the material that is most recently printed by the head nozzle; and
    delivering, with the surface modification apparatus, a flow inducing gas to the material most recently printed by the head nozzle to reduce ridging between the material most recently printed by the head nozzle assembly and material previously printed by the head nozzle assembly.

2. The method of claim 1, wherein the follower assembly is operable to move the surface modification apparatus toward or away from the material most recently printed by the head nozzle.

3. The method of claim 1, wherein the material most recently printed by the head nozzle is a plastics material.

4. The method of claim 3, wherein the flow inducing gas comprises a plastics solvent vapor.

5. The method of claim 3, wherein the flow inducing gas comprises acetone vapor.

6. The method of claim 3, wherein the flow inducing gas comprises a heated gas.

7. The method of claim 6, wherein the flow inducing gas comprises heated air.

* * * * *